(12) United States Patent
Shimodaira

(10) Patent No.: US 11,839,978 B2
(45) Date of Patent: Dec. 12, 2023

(54) METHOD OF ADJUSTING FORCE CONTROL PARAMETER

(71) Applicant: Seiko Epson Corporation, Tokyo (JP)

(72) Inventor: Yasuhiro Shimodaira, Matsumoto (JP)

(73) Assignee: SEIKO EPSON CORPORATION

(*) Notice: Subject to any disclaimer, the term of this patent is extended or adjusted under 35 U.S.C. 154(b) by 231 days.

(21) Appl. No.: 17/502,106

(22) Filed: Oct. 15, 2021

(65) Prior Publication Data

US 2022/0118610 A1 Apr. 21, 2022

(30) Foreign Application Priority Data

Oct. 16, 2020 (JP) .................................. 2020-174483

(51) Int. Cl.
 *B25J 9/16* (2006.01)
 *B25J 13/08* (2006.01)
(52) U.S. Cl.
 CPC ............. *B25J 9/163* (2013.01); *B25J 9/1687* (2013.01); *B25J 13/085* (2013.01)
(58) Field of Classification Search
 CPC ........ B25J 9/163; B25J 13/085; B25J 9/1633; B25J 9/0081; B25J 19/0095; B25J 9/1687; G05B 2219/39332
 See application file for complete search history.

(56) References Cited

U.S. PATENT DOCUMENTS

2007/0210740 A1* 9/2007 Sato ....................... B25J 9/1633
 318/646
2018/0225113 A1* 8/2018 Hasegawa ................ B25J 9/163

FOREIGN PATENT DOCUMENTS

JP H08-194521 A 7/1996
JP 2018-126798 A 8/2018
WO 2019/098044 A1 5/2019

* cited by examiner

*Primary Examiner* — Spencer D Patton
*Assistant Examiner* — Sagar Kc
(74) *Attorney, Agent, or Firm* — Harness, Dickey & Pierce, P.L.C.

(57) ABSTRACT

A method of adjusting a force control parameter includes a first step of moving a robot arm based on first information on work start position and orientation of the robot arm and a candidate value of a force control parameter, and acquiring second information on a working time taken for the work and third information on a force applied to the robot arm during the work, and a second step of acquiring an updated value obtained by updating of the candidate value of the force control parameter based on the acquired second information and third information, wherein the first step and the second step are repeatedly performed with noise added to the first information until the acquired working time or force applied to the robot arm converges, and a final value of the force control parameter is obtained.

7 Claims, 10 Drawing Sheets

METHOD OF ADJUSTING FORCE CONTROL PARAMETER

The present application is based on, and claims priority from JP Application Serial Number 2020-174483, filed Oct. 16, 2020, the disclosure of which is hereby incorporated by reference herein in its entirety.

BACKGROUND

1. Technical Field

The present disclosure relates to a method of adjusting a force control parameter.

2. Related Art

A robot having a robot arm and a force detection unit that detects a force applied to the robot arm and performing predetermined work by force control to drive the robot arm based on a detection result of the force detection unit is known. In the robot, for example, as disclosed in WO 2019/098044, for the force control, it is necessary to set a force control parameter to determine a mode for driving the robot arm to suitable values.

To set the force control parameter to the suitable value, an operation to repeat work on a trial basis while changing the force control parameter and determine the force control parameter suitable for the work is necessary. However, in the method, various conditions including the quantities and types of workpieces, positions and orientations of the robot arm during work, etc. are limited, and the force control parameter that exerts required performance only in the overfitting state, i.e., under a specific condition without variations of objects and robots are obtained. That is, the above described force control parameter is not suitable for real operation with variations in manufacturing and variations in gripping. As described above, it is difficult even for a person skilled in the art to set a force control parameter with balance between appropriate required force and torque and working time as productivity requirements required for force control.

SUMMARY

A method of adjusting a force control parameter according to an aspect of the present disclosure is a method of adjusting a force control parameter of adjusting a force control parameter of a robot having a robot arm driven by force control and performing work, including a first step of moving the robot arm based on first information on work start position and orientation of the robot arm and a candidate value of the force control parameter, and acquiring second information on a working time taken for the work and third information on a force applied to the robot arm during the work, and a second step of acquiring an updated value obtained by updating of the candidate value of the force control parameter based on the acquired second information and third information, wherein the first step and the second step are repeatedly performed with noise added to the first information until the acquired working time or force applied to the robot arm converges, and a final value of the force control parameter is obtained.

DESCRIPTION OF EXEMPLARY EMBODIMENTS

Embodiments

Figure 1:
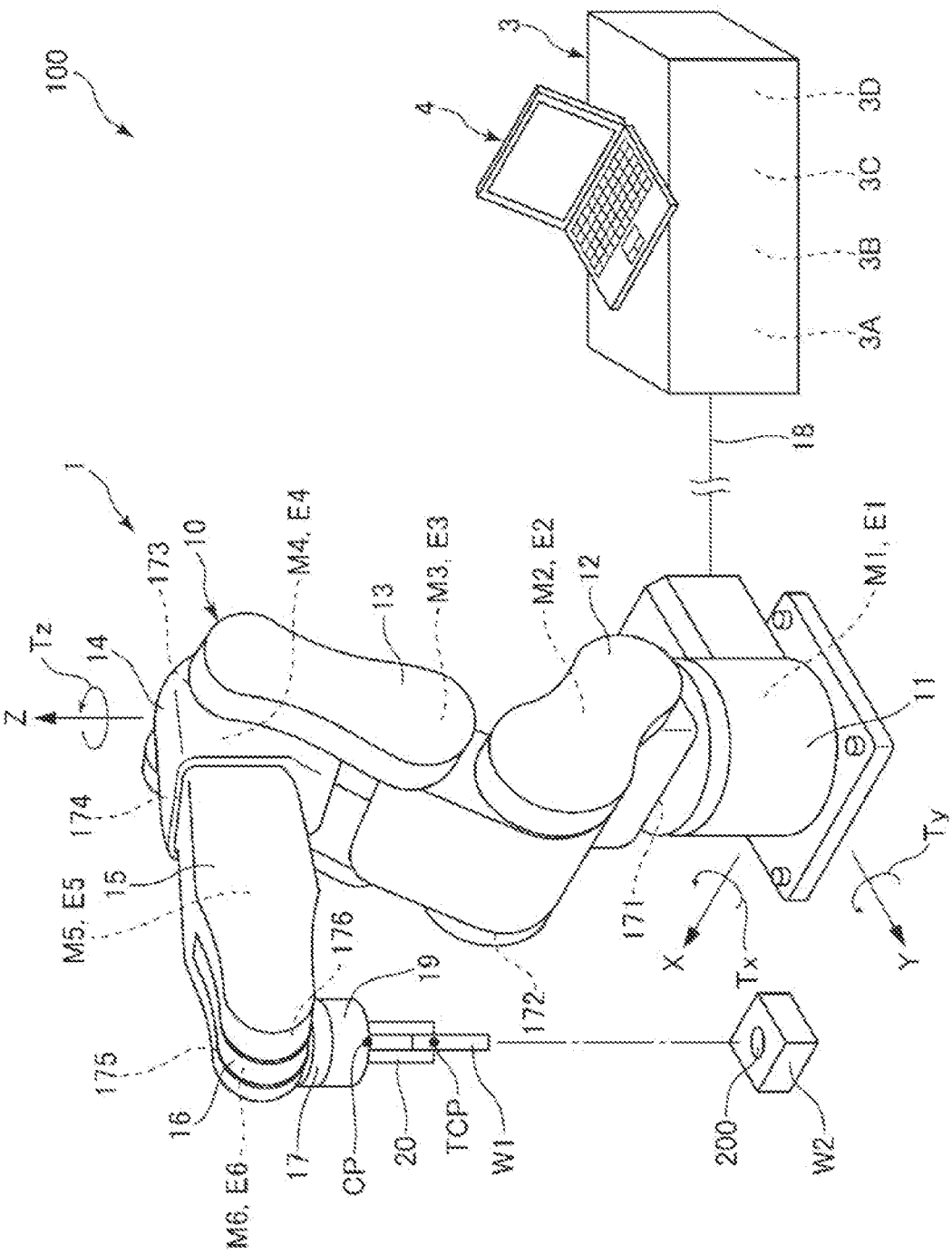
FIG. 1 shows an overall configuration of a robot system that executes a method of adjusting a force control parameter according to the present disclosure.
Figure 2:
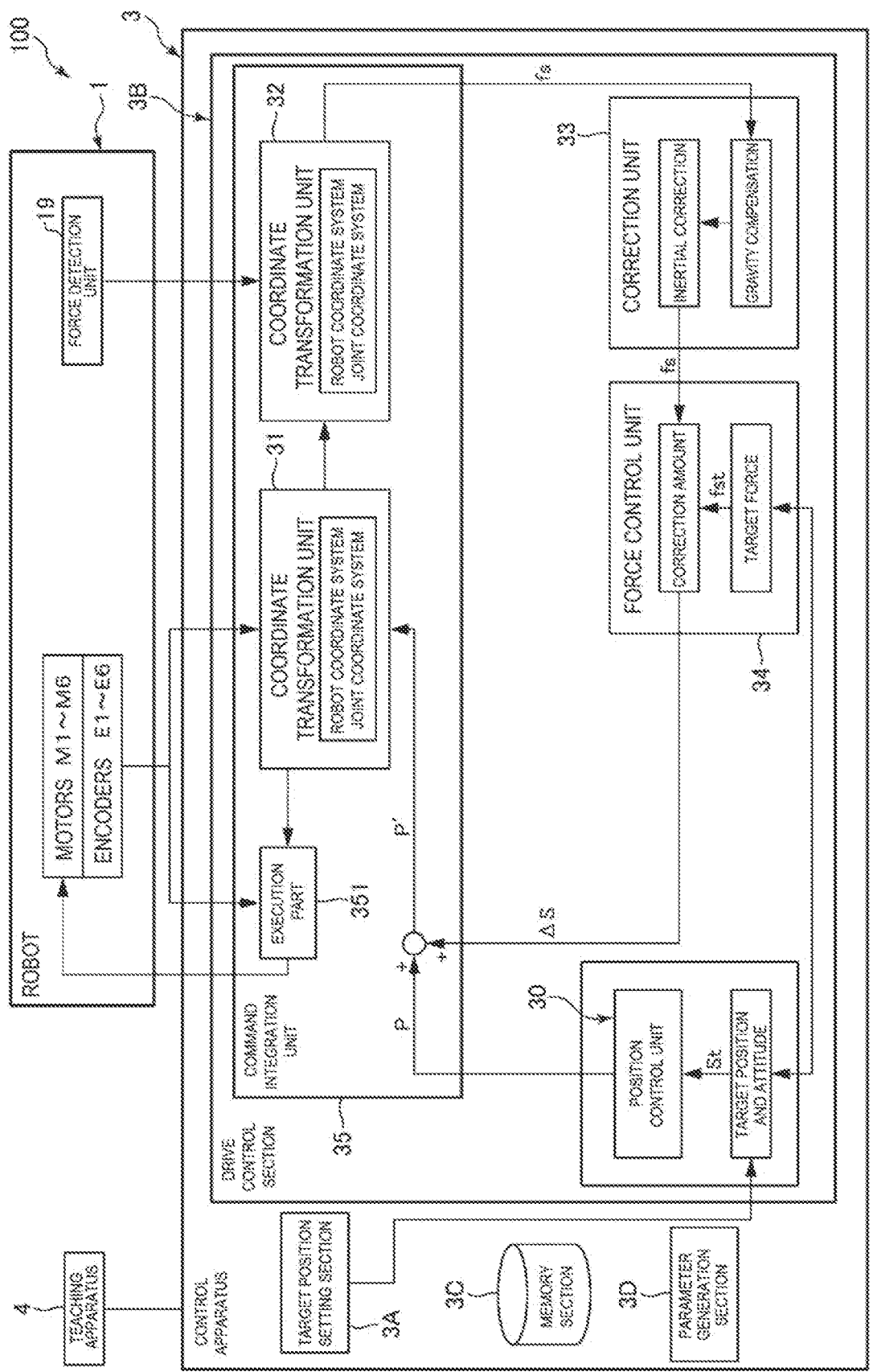
FIG. 2 is a block diagram of the robot system shown in FIG. 1.
Figure 3:
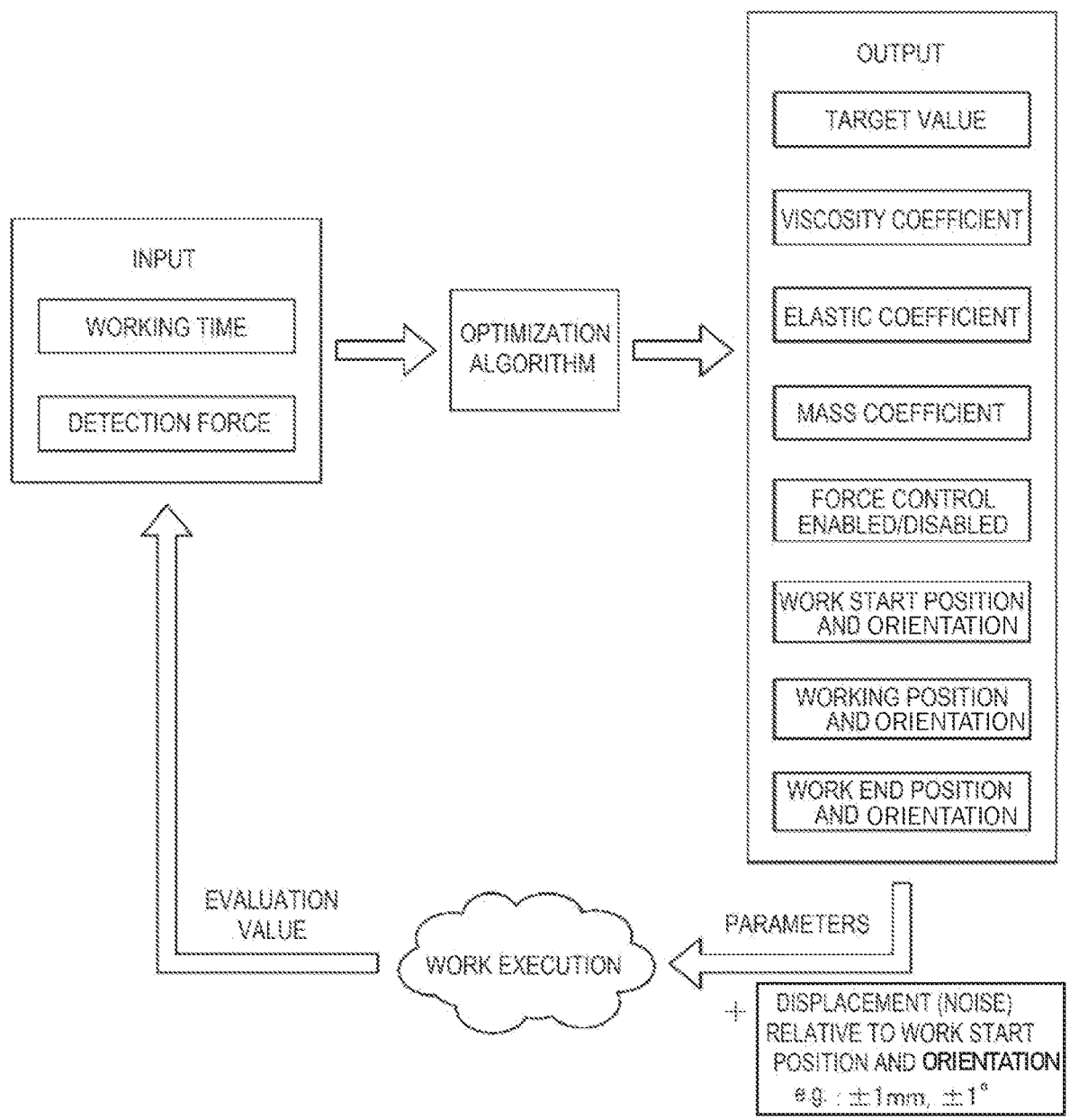
FIG. 3 is a conceptual diagram for explanation of a method of acquiring a force control parameter.
Figure 4:
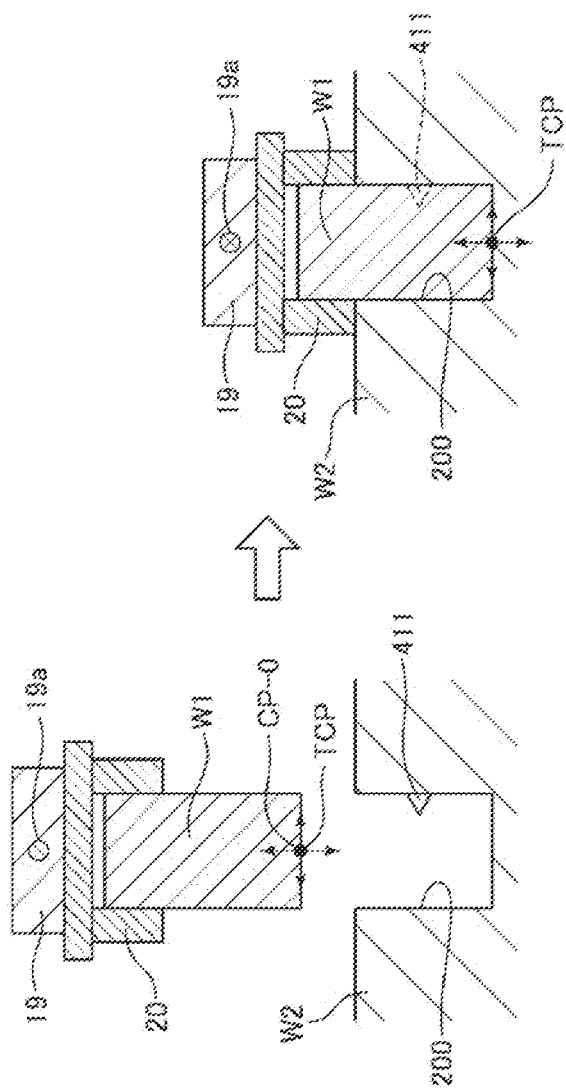
FIG. 4 is a sectional view for explanation of work start position and orientation and work end position and orientation.
Figure 5:
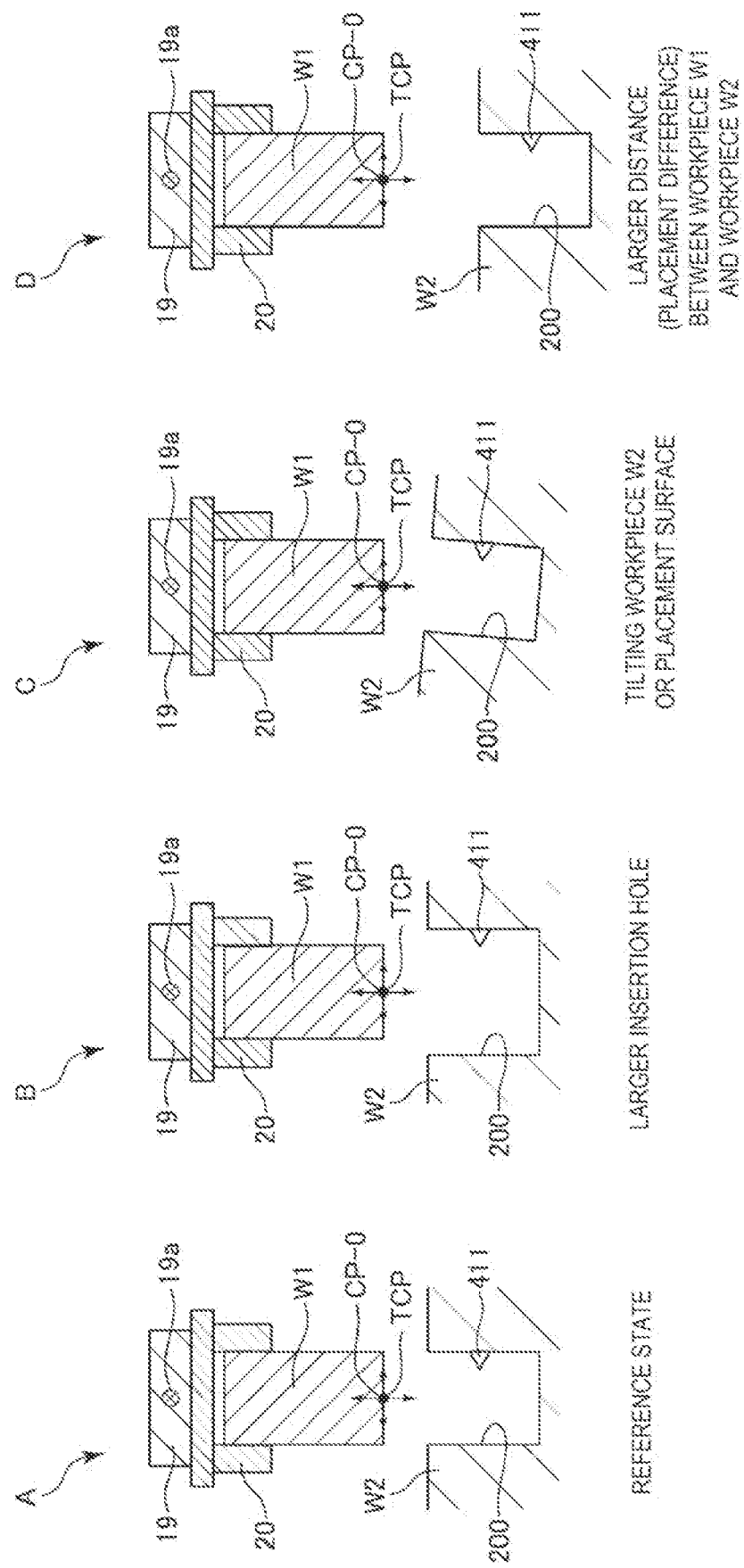
FIG. 5 is a diagram for explanation of variations in work environment that may be actually generated when work is performed in partially enlarged sectional views showing a first object, a second object, and a distal end of a robot arm.
Figure 6:
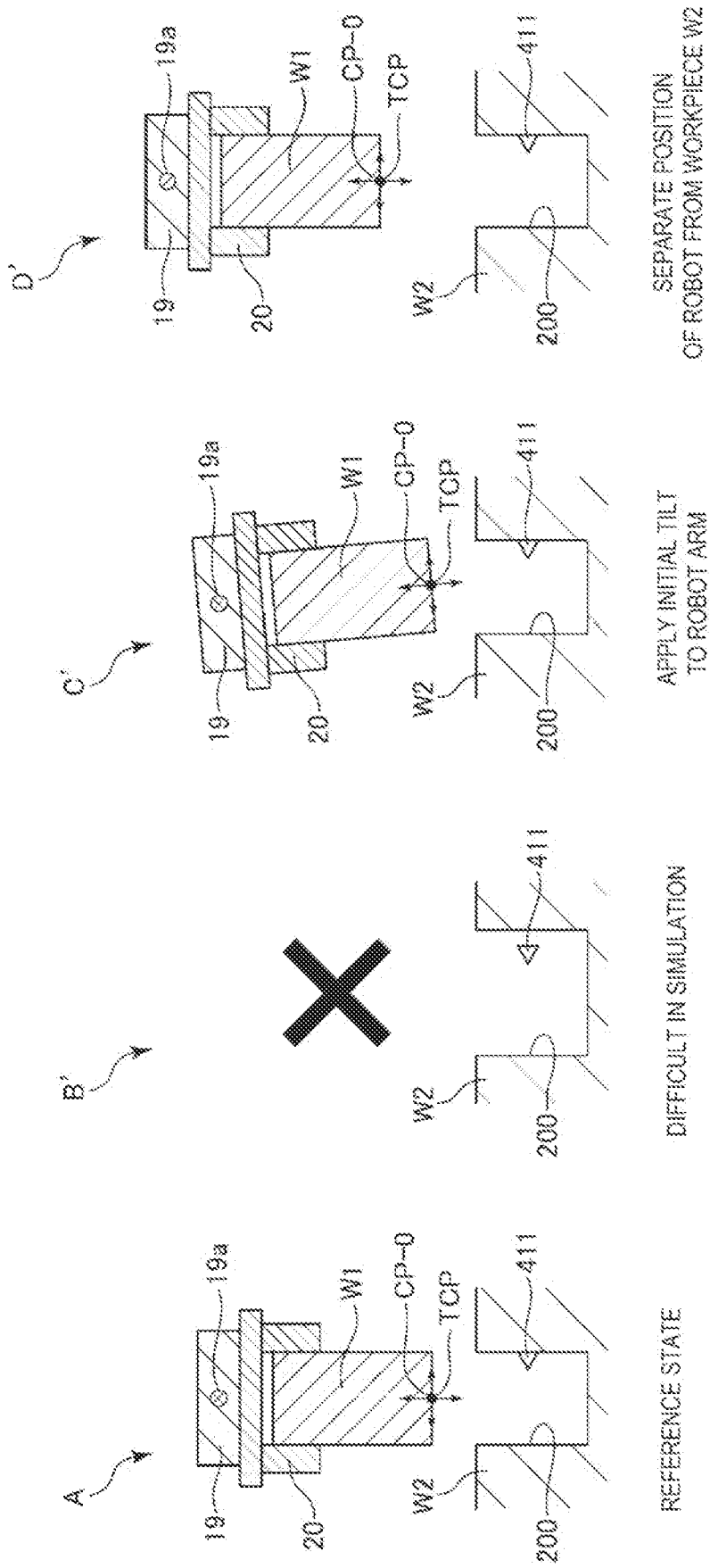
FIG. 6 shows a state simulatively reproducing variations in work environment that may be actually generated when work is performed in partially enlarged sectional views showing the first object, the second object, and the distal end of the robot arm.
Figure 7:
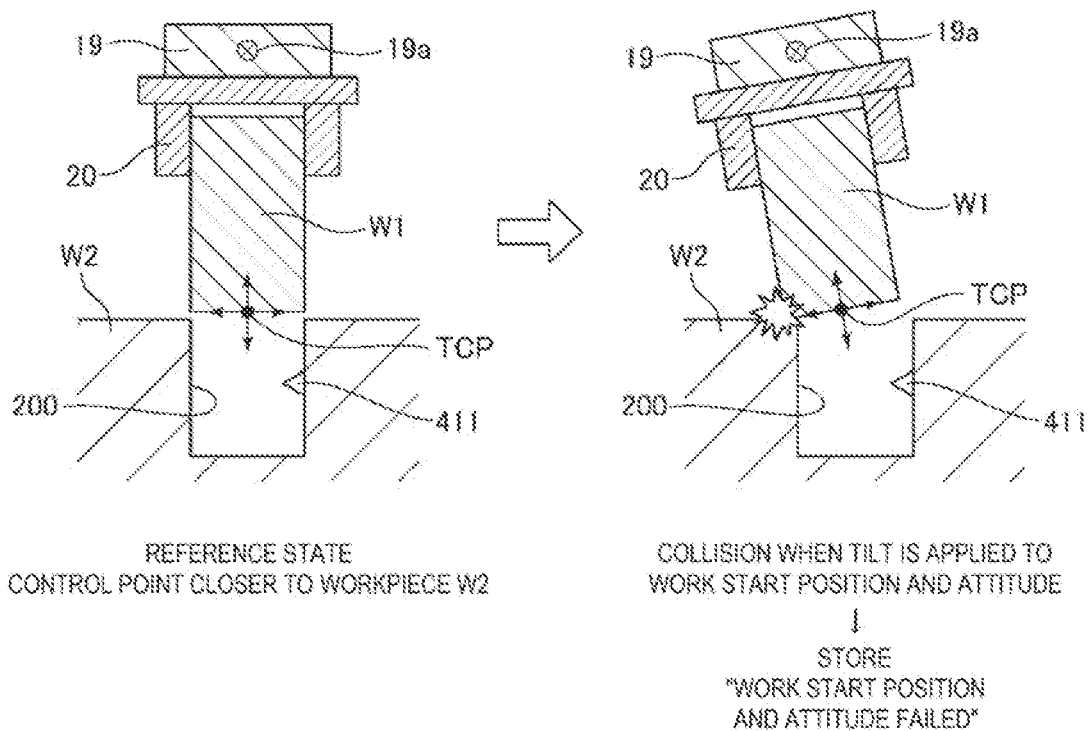
FIG. 7 shows an example of a state of a failure when the work start position and orientation are tilted in partially enlarged sectional views showing the first object, the second object, and the distal end of the robot arm.
Figure 8:
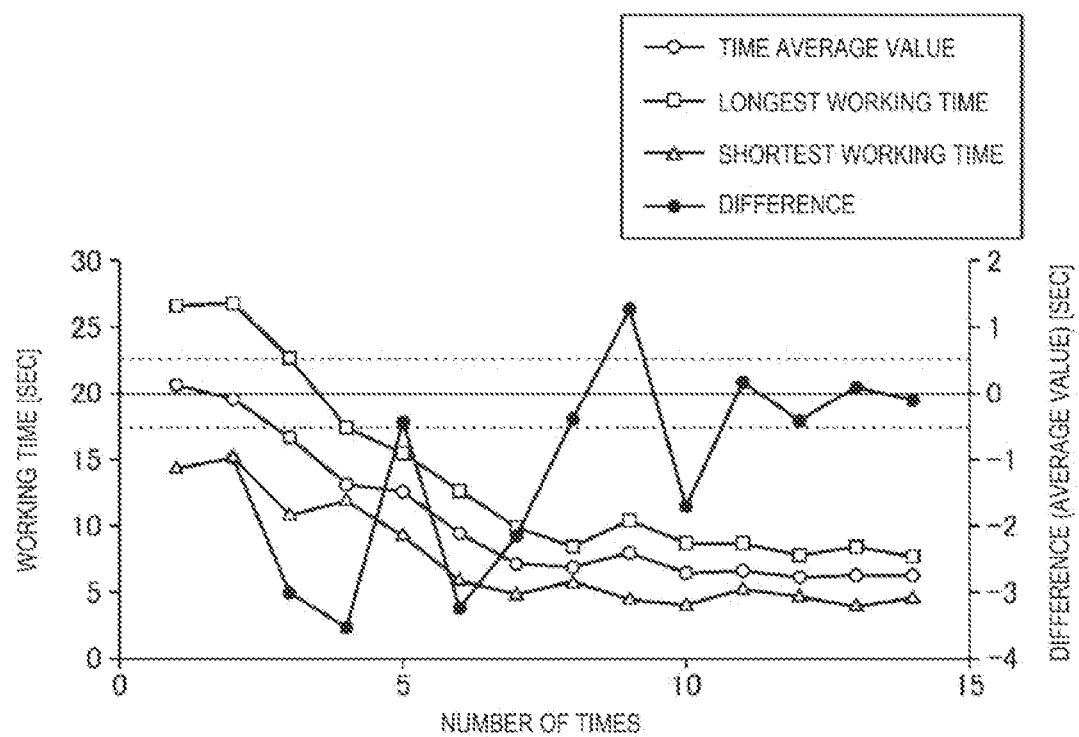
FIG. 8 is a graph in which information on working times with respect to each work are plotted.
Figure 9:
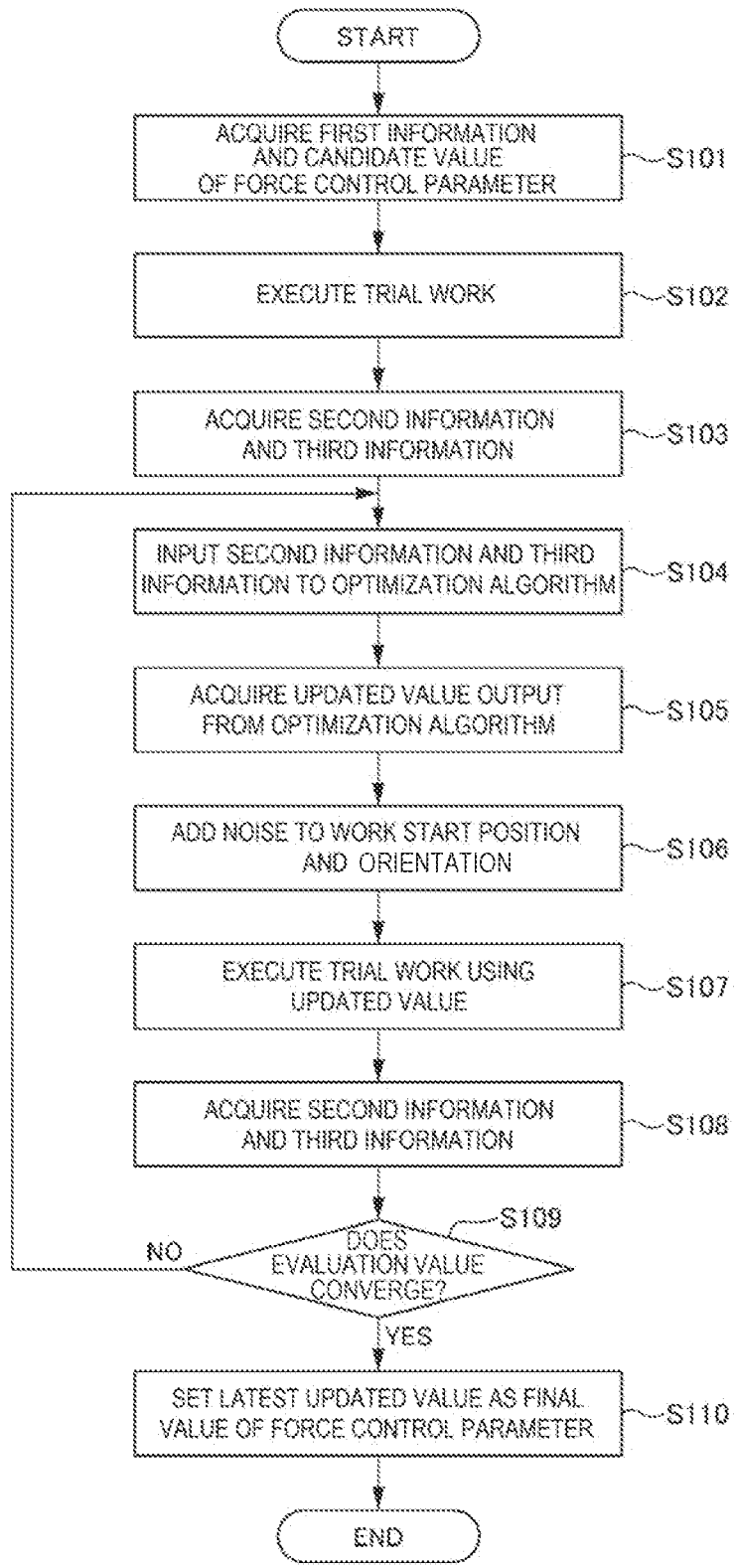
FIG. 9 is a flowchart for explanation of a control operation executed by the robot system shown in FIG. 1.

FIG. 1 shows an overall configuration of a robot system that executes a method of adjusting a force control parameter according to the present disclosure. FIG. 2 is a block diagram of the robot system shown in FIG. 1. FIG. 3 is a conceptual diagram for explanation of a method of acquiring a force control parameter. FIG. 4 is a sectional view for explanation of work start position and orientation and work end position and orientation. FIG. 5 is a diagram for explanation of variations in work environment that may be actually generated when work is performed in partially enlarged sectional views showing a first object, a second object, and a distal end of a robot arm. FIG. 6 shows a state simulatively reproducing variations in work environment that may be actually generated when work is performed in partially enlarged sectional views showing the first object, the second object, and the distal end of the robot arm. FIG. 7 shows an example of a state of a failure when the work start position and orientation are tilted in partially enlarged sectional views showing the first object, the second object, and the distal end of the robot arm. FIG. 8 is a graph in which information on working times with respect to each work are plotted. FIG. 9 is a flowchart for explanation of a control operation executed by the robot system shown in FIG. 1.

As below, a method of adjusting a force control parameter according to the present disclosure will be explained in detail based on preferred embodiments shown in the accompanying drawings. Hereinafter, for convenience of explanation, a +Z-axis direction, i.e., the upside in FIG. 1 is also referred to as "upper" and a −Z-axis direction, i.e., the downside is also referred to as "lower". Further, regarding a robot arm, a base 11 side in FIG. 1 is also referred to as "proximal end" and the opposite side, i.e., an end effector side is also referred to as "distal end". Furthermore, the Z-axis directions, i.e., the upward and downward directions in FIG. 1 are referred to as "vertical directions" and X-axis directions and Y-axis directions, i.e., the leftward and rightward directions are referred to as "horizontal directions".

As shown in FIG. 1, a robot system 100 includes a robot 1, a control apparatus 3 that controls the robot 1, and a teaching apparatus 4, and executes a method of adjusting a force control parameter according to the present disclosure.

First, the robot 1 is explained.

The robot 1 shown in FIG. 1 is a single-arm six-axis vertical articulated robot in the embodiment, and has a base 11 and a robot arm 10. Further, an end effector 20 may be attached to the distal end portion of the robot arm 10. The end effector 20 may be a component element of the robot 1 or not a component element of the robot 1.

Note that the robot 1 is not limited to the illustrated configuration, but may be e.g. a dual-arm articulated robot. Or, the robot 1 may be a horizontal articulated robot.

The base 11 is a supporter that driveably supports the robot arm 10 from the downside and fixed to e.g. a floor within a factory. In the robot 1, the base 11 is electrically coupled to the control apparatus 3 via a relay cable 18. Note that the coupling between the robot 1 and the control apparatus 3 is not limited to the wired coupling like the configuration shown in FIG. 1, but may be e.g. wireless coupling or coupling via a network such as the Internet.

In the embodiment, the robot arm 10 has a first arm 12, a second arm 13, a third arm 14, a fourth arm 15, a fifth arm 16, and a sixth arm 17, and these arms are sequentially coupled from the base 11 side. Note that the number of the arms of the robot arm 10 is not limited to six, but may be e.g. one, two, three, four, five, seven, or more. The sizes including the entire lengths of the respective arms are not particularly limited, but can be appropriately set.

The base 11 and the first arm 12 are coupled via a joint 171. Further, the first arm 12 is pivotable about a first pivot axis parallel to the vertical directions as a pivot center relative to the base 11. The first pivot axis is aligned with a normal of the floor to which the base 11 is fixed.

The first arm 12 and the second arm 13 are coupled via a joint 172. Further, the second arm 13 is pivotable about a second pivot axis parallel to the horizontal directions as a pivot center relative to the first arm 12. The second pivot axis is parallel to an axis orthogonal to the first pivot axis.

The second arm 13 and the third arm 14 are coupled via a joint 173. Further, the third arm 14 is pivotable about a third pivot axis parallel to the horizontal directions as a pivot center relative to the second arm 13. The third pivot axis is parallel to the second pivot axis.

The third arm 14 and the fourth arm 15 are coupled via a joint 174. Further, the fourth arm 15 is pivotable about a fourth pivot axis parallel to the center axis direction of the third arm 14 as a pivot center relative to the third arm 14. The fourth pivot axis is orthogonal to the third pivot axis.

The fourth arm 15 and the fifth arm 16 are coupled via a joint 175. Further, the fifth arm 16 is pivotable about a fifth pivot axis as a pivot center relative to the fourth arm 15. The fifth pivot axis is orthogonal to the fourth pivot axis.

The fifth arm 16 and the sixth arm 17 are coupled via a joint 176. Further, the sixth arm 17 is pivotable about a sixth pivot axis as a pivot center relative to the fifth arm 16. The sixth pivot axis is orthogonal to the fifth pivot axis.

Furthermore, the sixth arm 17 is a robot distal end portion located at the most distal end side of the robot arm 10. The sixth arm 17 may pivot together with the end effector 20 by driving of the robot arm 10.

The robot 1 includes a motor M1, a motor M2, a motor M3, a motor M4, a motor M5, and a motor M6 as drive units and an encoder E1, an encoder E2, an encoder E3, an encoder E4, an encoder E5, and an encoder E6. The motor M1 is provided inside of the joint 171 and relatively rotates the base 11 and the first arm 12. The motor M2 is provided inside of the joint 172 and relatively rotates the first arm 12 and the second arm 13. The motor M3 is provided inside of the joint 173 and relatively rotates the second arm 13 and the third arm 14. The motor M4 is provided inside of the joint 174 and relatively rotates the third arm 14 and the fourth arm 15. The motor M5 is provided inside of the joint 175 and relatively rotates the fourth arm 15 and the fifth arm 16. The motor M6 is provided inside of the joint 176 and relatively rotates the fifth arm 16 and the sixth arm 17.

Further, the encoder E1 is provided inside of the joint 171 and detects the position of the motor M1. The encoder E2 is provided inside of the joint 172 and detects the position of the motor M2. The encoder E3 is provided inside of the joint 173 and detects the position of the motor M3. The encoder E4 is provided inside of the joint 174 and detects the position of the motor M4. The encoder E5 is provided inside of the joint 175 and detects the position of the motor M5. The encoder E6 is provided inside of the joint 176 and detects the position of the motor M6.

The encoder E1 to encoder E6 are electrically coupled to the control apparatus 3 and position information, i.e., amounts of rotation of the motor M1 to motor M6 are transmitted to the control apparatus 3 as electrical signals. Then, the control apparatus 3 drives the motor M1 to motor M6 via motor drivers (not shown) based on the information. That is, to control the robot arm 10 is to control the motor M1 to motor M6.

A control point CP is set at the distal end of the robot arm 10. The control point CP is a point as a reference for control of the robot arm 10. In the robot system 100, the position of the control point CP is acquired in a robot coordinate system and the robot arm 10 is driven to move the control point CP to a desired position.

Further, in the robot 1, a force detection unit 19 that detects a force is detachably placed in the robot arm 10. The robot arm 10 may be driven with the force detection unit 19 placed therein. The force detection unit 19 is a six-axis force sensor in the embodiment. The force detection unit 19 detects magnitude of forces on three detection axes orthogonal to one another and magnitude of torque about the three detection axes. That is, the unit detects force components in the respective axial directions of the X-axis, the Y-axis, Z-axis orthogonal to one another, a force component in a Tx direction about the X-axis, a force component in a Ty direction about the Y-axis, and a force component in a Tz direction about the Z-axis. Note that, in the embodiment, the Z-axis directions are the vertical directions. The force components in the respective axial directions may be referred to as "translational force components" and the force components about the respective axes may be referred to as "torque components". The force detection unit 19 is not limited to the six-axis force sensor, but may have another configuration.

In the embodiment, the force detection unit 19 is placed in the sixth arm 17. Note that the placement position of the force detection unit 19 is not limited to the sixth arm 17, i.e., the arm located at the most distal end side, but may be in the other arm, between the adjacent arms, or in a lower part of the base 11, for example, or respectively placed in all of the joints.

The end effector 20 may be detachably attached to the force detection unit 19. The end effector 20 includes a hand gripping an object by moving a pair of claws closer to or away from each other. The present disclosure is not limited to that, but two or more claws may be provided. Or, a hand gripping an object by suction may be employed.

Further, in the robot coordinate system, a tool center point TCP is set in an arbitrary position at the distal end of the end effector 20, preferably, at the distal end at which the respective claws are close to each other. As described above, in the robot system 100, the position of the control point CP is acquired in the robot coordinate system and the robot arm 10 is driven to move the control point CP to a desired position. The type, particularly, the length of the end effector 20 is acquired, and thereby, an offset amount between the tool center point TCP and the control point CP may be acquired. Accordingly, the position of the tool center point TCP may be acquired in the robot coordinate system. Therefore, the tool center point TCP may be used as a reference for the control.

As shown in FIG. 1, the robot 1 performs work to grip, insert, and fits a workpiece W1 as a first object into a workpiece W2 as a second object. Here, "fit" is used as not only "fit" in the narrow sense, but used in the broad sense including "fit in" and "engage". Therefore, depending on the configurations of the workpiece W1 and the workpiece W2, "fit" may be read to "fit in", "engage", or the like. Note that the work may be work to grip the workpiece W2 and insert the workpiece W1 into the workpiece W2.

The workpiece W1 is a rod-shaped member having a circular cross-sectional shape. Note that the workpiece W1 may have a cross-sectional shape in a polygonal shape such as a triangular shape, a quadrangular shape, or a shape with more vertices, or a connector of an electronic apparatus, a plastic exterior, or the like. The workpiece W2 has a block shape having an insertion hole 200 in which the workpiece W1 is inserted.

As shown in FIGS. 4 to 7, a snapping mechanism 411 acting as a resisting force when the workpiece W1 is inserted is provided in the insertion hole 200 of the workpiece W2. The snapping mechanism 411 itself as a component may have a function in practical use for insertion of a connector or assembly of plastic components. Here, the snapping mechanism 411 is separately shown as a functional component.

Next, the control apparatus 3 and the teaching apparatus 4 will be explained.

The control apparatus 3 is placed apart from the robot 1 and includes a computer having a CPU (Central Processing Unit) as an example of a processor provided therein. The control apparatus 3 may be provided inside of the base 11 of the robot 1.

The control apparatus 3 is communicably coupled to the robot 1 by the relay cable 18. The control apparatus 3 is coupled to the teaching apparatus 4 by a cable or communicably in wireless connection. The teaching apparatus 4 may be a dedicated computer or a general-purpose computer in which programs for teaching the robot 1 are installed. For example, a teaching pendant or the like as a dedicated device for teaching the robot 1 may be used in place of the teaching apparatus 4. Further, the control apparatus 3 and the teaching apparatus 4 may have separate housings or may be integrally formed.

In the teaching apparatus 4, a program for generating an execution program having a target position and orientation $S_t$ and a target force $f_{St}$, which will be described later, as parameters in the control apparatus 3 and loading the execution program in the control apparatus 3 may be installed. The teaching apparatus 4 includes a display, a processor, a RAM, and a ROM, and these hardware resources generate the execution program in cooperation with a teaching program.

As shown in FIG. 2, the control apparatus 3 is a computer in which a control program for control of the robot 1 is installed. The control apparatus 3 includes a processor and a RAM and a ROM (not shown), and these hardware resources control the robot 1 in cooperation with the program.

Further, as shown in FIG. 2, the control apparatus 3 has a target position setting section 3A, a drive control section 3B, and a memory section 3C, and a parameter generation section 3D. The memory section 3C includes e.g. a volatile memory such as a RAM (Random Access Memory), a nonvolatile memory such as a ROM (Read Only Memory), and a detachable external memory device. In the memory section 3C, operation programs for actuation of the robot 1 including programs for execution of the method of adjusting the force control parameter according to the present disclosure are stored.

The target position setting section 3A sets the target position and orientation $S_t$ and a motion route for execution of predetermined work on the workpiece W1. The target position setting section 3A sets the target position and orientation $S_t$ and the motion route based on teaching information input from the teaching apparatus 4 or the like.

The drive control section 3B controls driving of the robot arm 10 and has a position control unit 30, a coordinate transformation unit 31, a coordinate transformation unit 32, a correction unit 33, a force control unit 34, and a command integration unit 35.

The position control unit 30 generates a position command signal, i.e., a position command value for controlling the position of the tool center point TCP of the robot 1 according to a target position designated by a command created in advance.

Here, the control apparatus 3 can control motion of the robot 1 by force control or the like. "Force control" refers to control of the motion of the robot 1 to change the position of the end effector 20, i.e., the position of the tool center point TCP and the orientations of the first arm 12 to sixth arm 17 based on the detection result of the force detection unit 19.

The force control includes e.g. force trigger control and impedance control. In the force trigger control, force detection is performed by the force detection unit 19, and the robot arm 10 is moved and changed in orientation until a predetermined force is detected by the force detection unit 19.

The impedance control includes profile control. In the impedance control, the motion of the robot arm 10 is controlled so that the force applied to the distal end portion of the robot arm 10 may be maintained as equal to the predetermined force as possible, that is, a force in a predetermined direction detected by the force detection unit 19 may be maintained as equal to the target force $f_{St}$ as possible. Thereby, for example, when the impedance control is performed on the robot arm 10, the robot arm 10 performs profiling motion for an external force applied by an object or an operator with respect to the predetermined direction. Note that the target force $f_{St}$ includes zero. For example, as one of settings in a case of the profiling motion, the target value may be set to "0". The target force $f_{St}$ may be set to another numerical value than zero. The target force $f_{St}$ can be appropriately set by the worker.

The memory section 3C stores correspondence relationships between combinations of the rotation angles of the motor M1 to motor M6 and the positions of the tool center point TCP in the robot coordinate system. Further, the control apparatus 3 stores at least one of the target position and orientation $S_t$ and the target force $f_{St}$ for each step of the work performed by the robot 1 according to the command in the memory section 3C. The command having the target position and orientation $S_t$ and the target force $f_{St}$ as parameters is set for each step of the work performed by the robot 1.

The drive control section 3B controls the first arm to sixth arm 17 so that the set target position and orientation $S_t$ and target force $f_{St}$ may coincide at the tool center point TCP. The target force $f_{St}$ is a detection force and torque of the force detection unit 19 to be achieved by the motion of the first arm 12 to sixth arm 17. Here, the character "S" expresses one direction of directions of the axes (X, Y, Z) defining the robot coordinate system. Further, "S" also expresses a position in an S direction. For example, when S=X, an X direction component of the target position set in the robot coordinate system is $S_t=X_t$, and an X direction component of the target force is $f_{St}=f_{Xt}$.

In the drive control section 3B, when the rotation angles of the motor M1 to motor M6 are acquired, the coordinate transformation unit 31 shown in FIG. 2 transforms the rotation angles into the position and orientation S (X, Y, Z, Tx, Ty, Tz) of the tool center point TCP in the robot coordinate system based on the correspondence relationships. Then, the coordinate transformation unit 32 specifies an acting force $f_S$ actually acting on the force detection unit 19 in the robot coordinate system based on the position and orientation S of the tool center point TCP and the detection value of the force detection unit 19.

The point of application of the acting force $f_S$ is defined as a force detection origin separate from the tool center point TCP. The force detection origin corresponds to a point at which the force detection unit 19 detects a force. Note that the control apparatus 3 stores a correspondence relationship defining directions of detection axes in a sensor coordinate system of the force detection unit 19 with respect to each position and orientation S of the tool center point TCP in the robot coordinate system. Therefore, the control apparatus 3 may specify the acting force $f_S$ in the robot coordinate system based on the position and orientation S of the tool center point TCP in the robot coordinate system and the correspondence relationship. Further, torque acting on the robot may be calculated from the acting force $f_S$ and a distance from a contact point to the force detection unit 19 and is specified as a torque component. Note that, when the end effector 20 performs work in contact with the workpiece W1, the contact point may be regarded as the tool center point TCP.

The correction unit 33 performs gravity compensation on the acting force $f_S$. The gravity compensation refers to removal of components of a force and torque caused by the gravity force from the acting force $f_S$. The gravity-compensated acting force $f_S$ may be regarded as another force than the gravity force acting on the robot arm 10 or the end effector 20.

Further, the correction unit 33 performs inertia compensation on the acting force $f_S$. The inertia compensation refers to removal of components of a force and torque caused by the inertial force from the acting force $f_S$. The inertia-compensated acting force $f_S$ may be regarded as another force than the inertial force acting on the robot arm 10 or the end effector 20.

The force control unit 34 performs impedance control. The impedance control is active impedance control that realizes virtual mechanical impedance using the motor M1 to motor M6. The control apparatus 3 executes the impedance control in processes under contact conditions in which forces are applied to the end effector 20 from objects including fitting work, screwing work, polishing work of the workpiece W1 and the workpiece W2 and for direct teaching. Even in another case than the above described processes, for example, the impedance control is performed when a human contacts the robot 1, and thereby, safety may be increased.

In the impedance control, the target force $f_{St}$ is substituted into the equation of motion, which will be described later, and the rotation angles of the motor M1 to motor M6 are derived. The signals for controlling the motor M1 to motor M6 by the control apparatus 3 are PWM (Pulse Width Modulation)-modulated signals.

In a non-contact process in which no external force is applied to the end effector 20, the control apparatus 3 controls the motor M1 to motor M6 at the rotation angles derived by linear calculation from the target position and orientations $S_t$. A mode in which the motor M1 to motor M6 are controlled at the rotation angles derived by linear calculation from the target position and orientations $S_t$ is referred to as "position control mode".

The control apparatus 3 specifies a force-derived correction amount $\Delta S$ by substitution of the target force $f_{St}$ and the acting force $f_S$ into the equation of motion of the impedance control. The force-derived correction amount $\Delta S$ refers to magnitude of the position and orientation S to which the tool center point TCP should move to resolve a force deviation $\Delta f_S(t)$ from the target force $f_{St}$ when the tool center point TCP is subjected to mechanical impedance. The following Equation (1) is the equation of motion of the impedance control.

$$m\Delta\ddot{S}(t)+d\Delta\dot{S}(t)+k\Delta S(t)=\Delta f_S(t) \tag{1}$$

The left side of Equation (1) is formed by the first term in which the second-order differential value of the position and orientation S of the tool center point TCP is multiplied by a virtual mass coefficient m (hereinafter, referred to as "mass coefficient m"), the second term in which the differential value of the position and orientation S of the tool center point TCP is multiplied by a virtual viscosity coefficient d (hereinafter, referred to as "viscosity coefficient d"), and the third term in which the position and orientation S of the tool center point TCP is multiplied by a virtual elastic coefficient k (hereinafter, referred to as "elastic coefficient k"). The right side of Equation (1) is formed by the force deviation $\Delta f_S(t)$ obtained by subtraction of the real force f from the target force $f_{St}$. The differential in Equation (1) refers to time differential. In a process performed by the robot 1, a constant value may be set as the target force $f_{St}$ or a time function may be set as the target force $f_{St}$.

The mass coefficient m refers to a mass that the tool center point TCP virtually has, the viscosity coefficient d refers to a viscous resistance to which the tool center point TCP is virtually subjected, and the elastic coefficient k refers to a spring constant of an elastic force to which the tool center point TCP is virtually subjected.

The larger the value of the mass coefficient m, the lower the acceleration of the motion, and the smaller the value of the mass coefficient m, the higher the acceleration of the motion. The larger the value of the viscosity coefficient d, the lower the velocity of the motion, and the smaller the value of the viscosity coefficient d, the higher the velocity of the motion. The larger the value of the elastic coefficient k, the higher the spring property, and the smaller the value of the elastic coefficient k, the lower the spring property.

These mass coefficient m, viscosity coefficient d, and elastic coefficient k may be set to different values with respect to each direction or set to common values regardless of the directions. Further, the mass coefficient m, the viscosity coefficient d, and the elastic coefficient k can be appropriately set by the worker before work.

The mass coefficient m, the viscosity coefficient d, and the elastic coefficient k are the force control parameters. The force control parameters are set prior to actual work by the robot arm 10. The force control parameters include the above described target force and the work start position and orientation, working position and orientation, the work end position and orientation, etc. as shown in FIG. 3 in addition to the mass coefficient m, the viscosity coefficient d, and the elastic coefficient k.

As described above, in the robot system 100, during execution of the force control, the correction amount is obtained from the detection value of the force detection unit 19, the preset force control parameters, and the preset target force. The correction amount refers to the above described force-derived correction amount $\Delta S$ and a difference between the position in which the external force is applied and the position to which the tool center point TCP should be moved.

Then, the command integration unit 35 adds the force-derived correction amount $\Delta S$ to the position command value P generated by the position control unit 30. The addition is performed as necessary, and thereby, the command integration unit 35 obtains a new position command value P' from the position command value P used for movement to the position in which the external force is applied.

Then, the coordinate transformation unit 31 transforms the new position command value P' into the robot coordinates and an execution part 351 executes, and thereby, the tool center point TCP is moved to the position in consideration of the force-derived correction amount $\Delta S$ to respond to the external force and the more load applied to the object in contact with the robot 1 may be relaxed.

According to the above described drive control section 3B, the robot arm 10 may be driven with the workpiece W1 gripped to move the tool center point TCP toward the target position and orientation $S_t$ and to move the tool center point TCP until the target force $f_{St}$ becomes a preset value. Specifically, the insertion work is performed until the workpiece W1 is inserted into the insertion hole of the workpiece W2 and the preset target force $f_{St}$ is detected, and thereby, the insertion work may be completed. Further, in the insertion process, the above described force control is performed, and thereby, excessive loads applied to the workpiece W1 and the workpiece W2 may be prevented or suppressed.

The parameter generation section 3D shown in FIG. 2 generates a parameter by an algorithm of a continuous optimization problem. Specifically, the parameter generation section 3D repeatedly learns from evaluation values as input data and generates a parameter for searching for the minimum value of an objective function.

The algorithm of the continuous optimization problem is to receive an input value, evaluate and calculate parameters for the next trial, and outputs a result as an output value. The input value includes e.g. a time taken for work, i.e., information on a working time and a force applied to the robot arm during work, i.e., a detection force detected by the force detection unit 19 during work. The output value includes e.g. an updated value of the force control parameter. These will be described later in detail.

The algorithm includes the Nelder-Mead method, the Newton's method, the Covariance Matrix Adaptation Evolution Strategy, the Particle Swarm Optimization, and Bayesian optimization.

For the algorithm, multi-objective optimization is performed with an appropriately set distribution ratio for the respective input values forming an evaluation function, and thereby, the number of times of work to a convergence may be reduced.

In the embodiment, the algorithm of the continuous optimization problem is employed, however, an effect of preventing overfitting by varying the work start position may be similarly obtained using an algorithm with discrete values as parameter output.

Here, it is necessary for the worker to set the above described force control parameters to appropriate values before work according to details of the work, types of the workpiece W1 and the workpiece W2, or the like. These are set to the appropriate values, and thereby, the mode of the robot arm 10 during work may be set to a mode suitable for the work and accurate work may be performed without excessive loads on the workpiece W1 and the workpiece W2 in a desired working time.

However, it is difficult to set the force control parameters to appropriate values. In related art, it is necessary to set appropriate values of the force control parameters by groping through a trial and error process until a desired working result is obtained while performing work on a trial basis and changing the force control parameters at many times based on the working results including the working times etc. In the method, various conditions including the quantity and type of workpieces and the position and orientation of the robot arm 10 during work are limited, and the force control parameter that exerts required performance only in the overfitting state, i.e., in a specific condition without variations of objects and robots are obtained. That is, the above described force control parameters are not suitable for real operation with variations in manufacturing and variations in gripping. As described above, it is difficult even for a person skilled in the art to set force control parameters with balance between appropriate required force and torque and the working time as productivity requirements required for force control. On the other hand, in the present disclosure, the problem may be solved in the following manner. As below, the method of adjusting the force control parameter according to the present disclosure will be explained using the flowchart shown in FIG. 9 with reference to FIG. 3.

The following respective steps are shared by the control apparatus 3 and the teaching apparatus 4 in the embodiment, however, the present disclosure is not limited to that. One of the control apparatus 3 and the teaching apparatus 4 may execute the steps.

First, a worker inputs first information on the work start position and orientation of the robot arm 10 and candidate values of the force control parameters. The input is performed using the teaching apparatus 4. For example, a work start position is input by input of values of the coordinates of the tool center point TCP and a work start orientation is input by input of values of the angles of the respective joints.

The candidate values of the force control parameters are initial set values of the target force, the mass coefficient m, the viscosity coefficient d, the elastic coefficient k, and the work end position and orientation. In the initial state, arbitrary initial values may be set in advance or the target force, the mass coefficient m, the viscosity coefficient d, the elastic coefficient k, and the work end position and orientation may be respectively input and set. The target force, the mass coefficient m, the viscosity coefficient d, and the elastic coefficient k are respectively set by input of numeral values. Further, a work end position is input by input of values of the coordinates of the tool center point TCP and a work end orientation is input by input of values of the angles of the respective joints.

For the start of the method of adjusting the force control parameter, when the worker inputs the first information, it is preferable to input the work start position and orientation by a range. That is, it is preferable that the first information input by the worker is a value having a range of the work start position and orientation. Thereby, work in consideration of a difference amount of the work start position and orientation may be performed and an evaluation value may be obtained. Therefore, the more proper force control parameters may be set by execution of steps, which will be described later.

At step S101, the above described input information is acquired. That is, the first information on the work start position and orientation of the robot arm 10 and the candidate values of the force control parameters are acquired. "Acquisition" in this specification refers to reception and storage of information in one of the control apparatus 3, the teaching apparatus 4, and a communicable external memory device.

Then, at step S102, work is executed on a trial basis. That is, the robot arm 10 is driven based on the information acquired at step S101 to execute work on a trial basis. Then, at step S103, second information on a working time taken for the work and third information on a force applied to the robot arm 10 during work are acquired. The second information refers to a time from the start to the end of the work, and may be measured by a timer provided in the control apparatus 3 or the teaching apparatus 4 or measured and input to the control apparatus 3 or the teaching apparatus 4 by the worker.

The third information may be temporal information of the force applied to the robot arm 10 during work or the maximum value of the force applied to the robot arm 10 during work. Or, the force applied to the robot arm 10 during work refers to the detection value detected by the force detection unit 19 and, as described above, includes the force components in the respective axial directions of the X-axis, the Y-axis, Z-axis and the force component in the Tx direction about the X-axis, the force component in the Ty direction about the Y-axis, and the force component in the Tz direction about the Z-axis. Hereinafter, these are collectively referred to as "detection force".

When the method of adjusting the force control parameter according to the present disclosure is executed using the second information acquired at step S103 as the maximum value of the force applied to the robot arm 10 during work, the force control parameters that may effectively reduce the loads applied onto the workpiece W1 and the workpiece W2 during work may be set.

The above described step S103 is a first step of acquiring the second information on the working time taken for work by moving the robot arm 10 based on the first information on the work start position or the work start orientation of the robot arm 10 and the candidate values of the force control parameters and the third information on the force applied to the robot arm 10 during the work.

Then, at step S104, the second information and the third information are input to the parameter generation section 3D. Then, at step S105, the updated values of the force control parameters output from the parameter generation section 3D are acquired.

The updated values of the force control parameters include the target force, a virtual mass coefficient, a virtual elastic coefficient, a virtual mass coefficient, the work start position and orientation, the working position and orientation, and the work end position and orientation. The updated values of the force control parameters are values properly corrected by finding of features, tendencies, etc. read from the input second information and third information.

Note that the effect of the present disclosure may be obtained when the updated values of the force control parameters include at least one of the target force, the virtual viscosity coefficient, the virtual elastic coefficient, the virtual mass coefficient, the work start position, the work start orientation, the work end position, and the work end orientation.

As described above, the updated values of the force control parameters include at least one of the target force, the virtual viscosity coefficient, the virtual elastic coefficient, the virtual mass coefficient, the work start position and orientation, and the work end position and orientation. Thereby, when work is executed, the important parameter may be corrected and set.

The above described step S105 is a second step of acquiring the updated values formed by correction of the candidate values of the force control parameters based on the acquired second information and third information.

Then, at step S106, noise is added to the work start position or the work start orientation of the updated values acquired at step S105. Specifically, a numerical value randomly extracted from numerical values in a predetermined range, i.e., a random number is added to or multiplied by the updated value acquired at step S105. Thereby, variations in work start position and orientation are created, and input information may be generated on the assumption of, e.g., variations in placement position of the workpiece W2 and variations in dimensions of the workpiece W1 and the workpiece W2. As a result, the more proper force control parameters may be set.

Here, as an example, usefulness of introduction of variations in start position in insertion work will be explained using FIGS. 4 to 6. FIG. 4 is an enlarged longitudinal sectional view of the distal end of the robot arm 10 and the workpiece W1 and the workpiece W2 in FIG. 1. A value of a force detection origin 19 inside of the force detection unit 19 and work start position and orientation information CP-0 of the control point CP are used as evaluation values. The work start position and orientation information CP-0 is defined by robot coordinates of the control point CP and the angles of the respective joints.

Normal insertion work requires a shorter working time from before execution of the work to after the execution of the work and detection of no excessively large force. As shown in FIG. 4, the work start position and orientation of the workpiece W1 are intended and taught to linearly and smoothly engage with the insertion hole 200 of the workpiece W2.

However, for example, in an operation to repeat the same work in a state with the larger dimensional tolerance of the insertion hole 200 shown in FIG. 5 including e.g. a state B in which the insertion hole 200 is larger, a state C in which the insertion hole 200 of the workpiece W2 tilts or the placement surface of the workpiece W2 tilts, and a state D in which a distance from the workpiece W1 to the workpiece W2 is larger, unintended variations in a real environment are produced.

For example, when only the state A is employed as the work start position and orientation and a continuous optimization algorithm is applied, optimization of the force control parameters in the translational directions is performed, however, optimization of the force control parameters in the rotational directions does not affect the evaluation values and optimization is not performed on the variations in work start position and orientation like in the state C or the state D. As a result, probabilities of an excessive increase in working time and a failure of work raise. To avoid the situation, a solution of the optimization problem is required in real work.

As means for solving the above descried problem, a state C' shown in FIG. 6 in which the relative position relationship between the workpiece W1 and the workpiece W2 is the same as that in the state C in FIG. 5 is simulatively reproduced, for example, by changing of the work start position and orientation at the robot 1 side at which the position and the orientation are easily changed. Thereby, both the optimization of the force control parameters in the rotational directions and the optimization of the force control parameters in the translational directions may be achieved with less effort. Similarly, a state D' shown in FIG. 6 in which the relative position relationship between the workpiece W1 and the workpiece W2 is the same as that in the state D in FIG. 5 is simulatively reproduced by changing of the work start position and orientation at the robot 1 side at which the position and the orientation are easily changed.

It is difficult to simulatively reproduce the individual difference of the workpiece W2 itself as shown in the state B or a state B', however, regarding the variations shown in the state C', the variations increase in the directions including the condition shown in the state B' by increase of a repulsive force from the snapping mechanism 411 and variations in frictional force in the insertion hole 200 with respect to each work. As a result, the obtained force control parameters are preferable because overfitting is avoided and the parameters are less affected by changes in state.

In the state C, the tilt in the rotational directions, i.e., changes in orientation are described and, in the state D, changes in the Z-axis directions are explained, however, the same effects are obtained in the other directions. For example, a case where taught positions in the initial state before optimization are completely the same in the X-axis directions between the workpiece W1 and the workpiece W2, but different along the Y-axis leads to overfitting at optimization such that optimization is harder for variations in the X-axis directions and easier in the Y-axis directions.

As described above, in the present disclosure, variations in work start position and orientation are created in the robot 1 side, and the updated values of the force control parameters may be obtained on the assumption of, e.g., variations in placement position of the workpiece W2 and variations in dimensions of the workpiece W1 and the workpiece W2.

Then, at step S107, work on a trial basis is performed again using the updated values of the force control parameters acquired at step S106 and, at step S108, the work result, i.e., the second information and the third information is acquired.

Then, at step S109, whether or not the second information and the third information acquired at step S108 converges is determined. When a determination that the information does not converge is made at step S109, the process returns to step S104 and the subsequent steps are sequentially repeated. That is, the steps are repeated until the information converges.

As below, the second information will be specifically explained as an example. FIG. 8 is the graph in which results are plotted at each time when work on a trial basis is performed and the working time is acquired. In FIG. 8, the horizontal axis indicates the number counted with work results for ten times of work as one group, i.e., one generation. Further, the left vertical axis indicates the time taken for work and the right vertical axis indicates a time difference from the previous work.

In FIG. 8, "TIME AVERAGE", "LONGEST WORKING TIME", "SHORTEST WORKING TIME", and "DIFFERENCE" are respectively plotted, and the left vertical axis is applied to "TIME AVERAGE", "LONGEST WORKING TIME", and "SHORTEST WORKING TIME" and the right vertical axis is applied to "DIFFERENCE". "TIME AVERAGE" is an average value of the working times in the generation. "LONGEST WORKING TIME" is the longest working time in the generation. "SHORTEST WORKING TIME" is the shortest working time in the generation. "DIFFERENCE" is an average value of the differences of the working times from the previous work in the generation.

As shown in FIG. 8, in the 11th to 14th generations, a state with the difference equal to or less than a predetermined time, i.e., one second continues. In this case, in the 14th generation, convergence of the second information as the work result is determined. When a state with the difference of the working time from that in the previous generation equal to or less than one second continues at a predetermined number of times, i.e., in four generations, convergence is determined. Note that, at step S109 in the 1st to 13th generations, convergence is not determined, but convergence is determined in the 14th generation.

Note that, in the above description, the case where aggregation is performed with respect to each generation and whether or not the information converges is determined is explained, however, the present disclosure is not limited to that. For example, whether or not the information converges may be determined with respect to each work, e.g., at each time.

Further, in the above description, the case where the determination is made based on the difference in working time is explained, however, the present disclosure is not limited to that. Whether or not the information converges may be determined based on "TIME AVERAGE", "LONGEST WORKING TIME", "SHORTEST WORKING TIME", or the like.

As described above, in the method of adjusting the force control parameter of the present disclosure, the final value of the force control parameter is the updated value of the force control parameter when a state in which a degree of a difference between the working time obtained at the first step at an nth (n is an integer equal to or larger than one) time and the working time obtained at the first step at an (n+1)th time is equal to or less than a level continues at m (m is an integer equal to or larger than one) times. Thereby, the more proper force control parameter may be set.

Note that, in the above description, the configuration of determining whether or not the second information converges is explained, however, the present disclosure is not limited to that. A configuration of determining whether or not the third information converges may be employed or a configuration of determining whether or not the second information and the third information converge may be employed. When whether or not the third information converges is determined, for example, the determination may be made based on a difference between the maximum value of the detection force and the maximum value of the detection force in the previous work.

When the convergence is determined at step S109, the updated value of the latest updated value of force control parameter is used as the final value of the force control parameter and the value is set at step S110. That is, the updated value of force control parameter used for the 14th determination is used as the final value of the force control parameter and, after the execution of optimization according to the present disclosure, the final value is used as the force control parameter when work is repeatedly performed.

As described above, the method of adjusting the force control parameter according to the present disclosure is the method of adjusting the force control parameter of adjusting the force control parameter of the robot 1 having the robot arm 10 driven by force control and performing work. Further, the method of adjusting the force control parameter according to the present disclosure has the first step of moving the robot arm 10 based on the first information on the work start position and orientation of the robot arm 10 and the candidate value of the force control parameter, and acquiring the second information on the working time taken for work and the third information on the force applied to the robot arm 10 during work, and a second step of acquiring the updated value obtained by updating of the candidate value of the force control parameter based on the second information and the third information, and the first step and the second step are repeatedly performed with noise added to the first information until the acquired working time or force applied to the robot arm 10 converges and the final value of the force control parameter is obtained. Thereby, an operation to repeat work on a trial basis while changing the force control parameter and determining the force control parameter suitable for the work in related art may be omitted and the force control parameter may be properly and easily set.

Further, as described above, the work executed by the robot arm 10 is the insertion work to grip and insert the workpiece W1 as the first object into the workpiece W2 as the second object. In the insertion work, it is necessary to set the force control parameter to the more proper value. Therefore, when the robot arm 10 performs the insertion work, the method of adjusting the force control parameter according to the present disclosure is particularly effective.

It is preferable that, when the worker inputs the first information for starting the method of adjusting the force control parameter, the work start position and orientation are input by the range. That is, it is preferable that the first information input by the worker is a value having a range of the work start position and orientation.

As shown in FIG. 7, when the workpiece W1 is in the work start position and orientation too close to the workpiece W2, when the work start position and orientation are varied, that is, tilted, the work start position and orientation in which the workpiece W1 is in contact with the workpiece W2 is obtained or the work start position and orientation in which the workpiece W1 and the workpiece W2 contact with each other and the workpiece W1 and the workpiece W2 separate from each other is obtained.

As a result of the above described motion, reliability of the evaluation value obtained in the work may be insufficient. This leads to accuracy deterioration of the updated value output by the algorithm of the continuous optimization problem because of environment condition changes including a change in gripping condition and a change in position of the workpiece W1. Accordingly, in this case, a failure is preferably determined and stored. That is, when a detection force exceeding a threshold value as a preset range of gravity compensation and inertia compensation is detected, a failure is preferably stored.

In a case of a failure, only the change in work start position and orientation may be made and retried, a poor evaluation value not compliant with a constraint condition may be stored, or an error may be reported to the worker.

As described above, when the force applied to the robot arm 10 during the work based on the first information with added noise exceeds the threshold value in the preset range of gravity compensation and inertia compensation, a failure of the work is preferably stored. Thereby, the force control parameter may be subsequently set with reference to the condition of the failure.

OTHER CONFIGURATION EXAMPLES OF ROBOT SYSTEM

Figure 10:
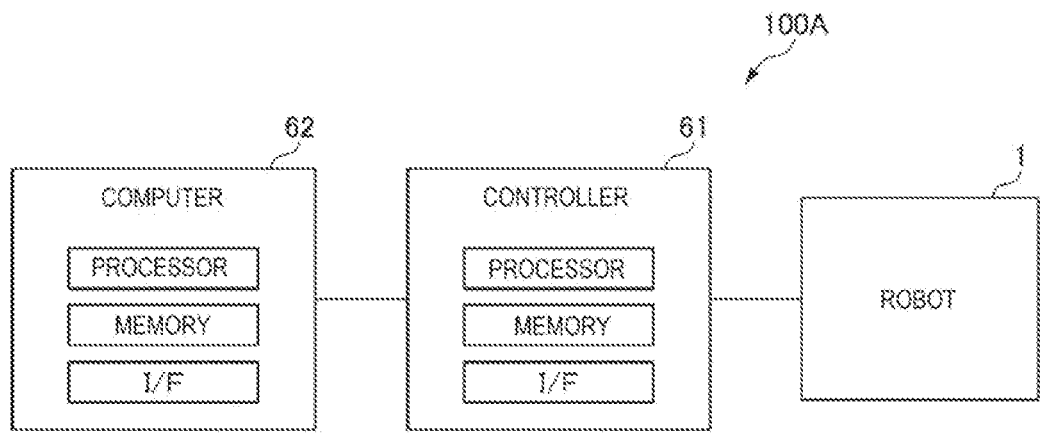
FIG. 10 is a block diagram for explanation of the robot system with a focus on hardware.

FIG. 10 is a block diagram for explanation of the robot system with a focus on hardware.

FIG. 10 shows an overall configuration of a robot system 100A in which the robot 1, a controller 61, and a computer 62 are coupled. The control of the robot 1 may be executed by reading of a command in a memory using a processor in the controller 61 or executed by reading of a command in a memory using a processor in the computer 62 via the controller 61.

Therefore, one or both of the controller 61 and the computer 62 may be regarded as "control apparatus".

Modified Example 1

Figure 11:
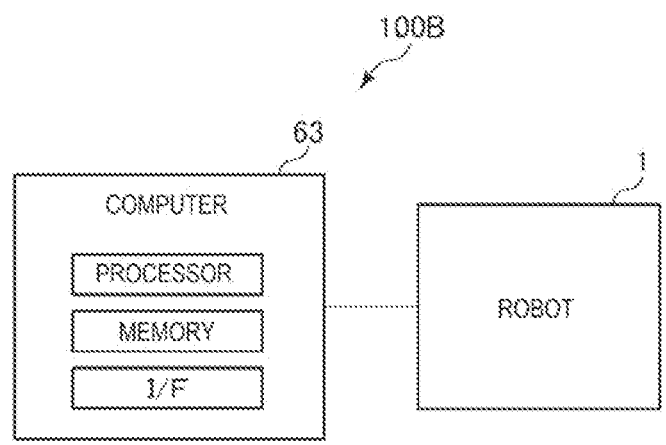
FIG. 11 is a block diagram showing modified example 1 of the robot system with a focus on hardware.

FIG. 11 is a block diagram showing modified example 1 of the robot system with a focus on hardware.

FIG. 11 shows an overall configuration of a robot system 100B in which a computer 63 is directly coupled to the robot 1. The control of the robot 1 is directly executed by reading of a command in a memory using a processor in the computer 63.

Therefore, the computer 63 may be regarded as "control apparatus".

Modified Example 2

Figure 12:
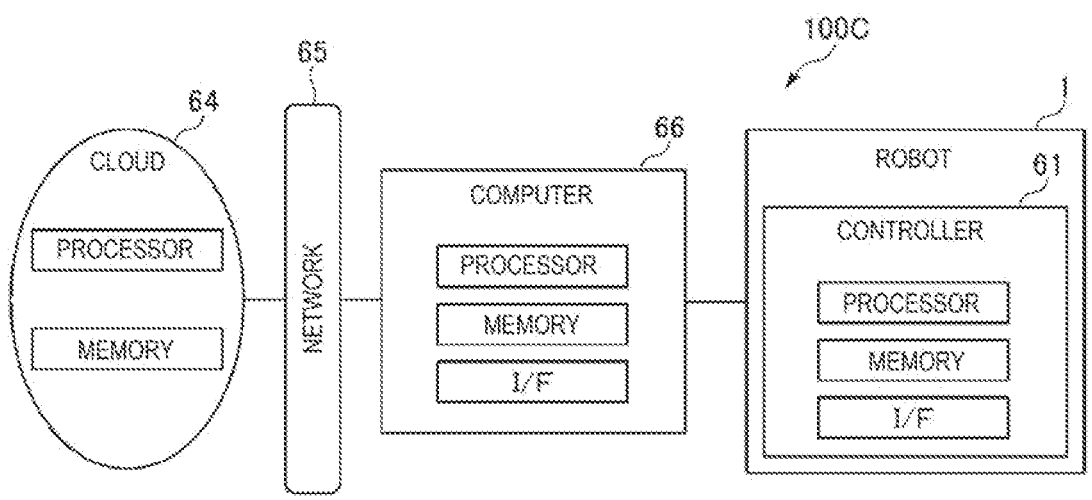
FIG. 12 is a block diagram showing modified example 2 of the robot system with a focus on hardware.

FIG. 12 is a block diagram showing modified example 2 of the robot system with a focus on hardware.

FIG. 12 shows an overall configuration of a robot system 100C in which the robot 1 containing the controller 61 and a computer 66 are coupled and the computer 66 is coupled to a cloud 64 via a network 65 such as a LAN. The control of the robot 1 may be executed by reading of a command in a memory using a processor in the computer 66, or executed by reading of a command in a memory via the computer 66 using a processor on the cloud 64.

Therefore, one, two, or three of the controller 61, the computer 66, and the cloud 64 may be regarded as "control apparatus".

As above, the method of adjusting the force control parameter according to the present disclosure is explained with respect to the illustrated embodiments, however, the present disclosure is not limited to the embodiments. The respective parts forming the robot system may be replaced by arbitrary configurations that may exert the same functions. Further, an arbitrary configuration may be added thereto.

What is claimed is:

1. A method of adjusting a force control parameter of a robot having a robot arm driven by force control and performing work, comprising:
   a first step of moving the robot arm based on first information on work start position and orientation of the robot arm and a candidate value of the force control parameter, and acquiring second information on a working time taken for the work and third information on a force applied to the robot arm during the work; and
   a second step of acquiring an updated value obtained by updating of the candidate value of the force control parameter based on the acquired second information and third information, wherein
   the first step and the second step are repeatedly performed with noise added to the first information until the acquired working time or force applied to the robot arm converges, and a final value of the force control parameter is obtained.

2. The method of adjusting the force control parameter according to claim 1, wherein
   the final value of the force control parameter is the updated value of the force control parameter when a state in which a degree of a difference between the working time obtained at the first step at an nth time, n being an integer equal to or larger than one, and the working time obtained at the first step at an (n+1)th time is equal to or less than a level continues at m times, m being an integer equal to or larger than one.

3. The method of adjusting the force control parameter according to claim 1, wherein
   the third information acquired at the first step is a maximum value of the force applied to the robot arm during the work.

4. The method of adjusting the force control parameter according to claim 1, wherein
   the updated value of the force control parameter includes at least one of a target force, a virtual viscosity coefficient, a virtual elastic coefficient, a virtual mass coefficient, the work start position and orientation, and work end position and orientation.

5. The method of adjusting the force control parameter according to claim 1, wherein
   the work is insertion work to grip and insert a first object into a second object.

6. The method of adjusting the force control parameter according to claim 1, wherein
   the first information input by a worker is a value having a range of the work start position and orientation.

7. The method of adjusting the force control parameter according to claim 1, wherein
   when the force applied to the robot arm during the work based on the first information with added noise exceeds a threshold value as a preset range of gravity compensation and inertia compensation, a failure of the work is stored.

* * * * *